April 9, 1963 J. D. M. VELTE 3,084,773
TRANSMISSION SHIFT CONTROLLING MECHANISM
Filed Jan. 17, 1961 2 Sheets-Sheet 1
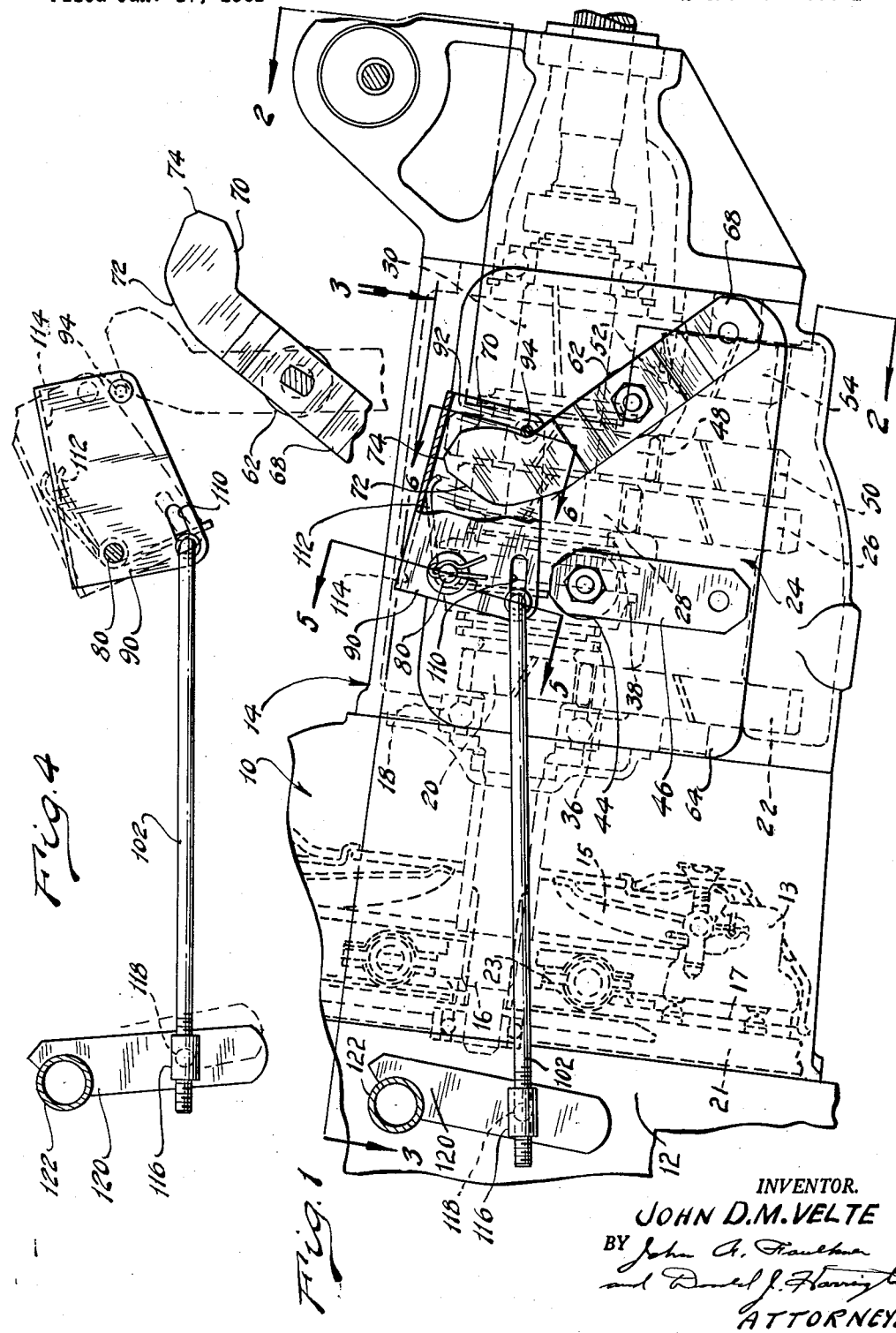
INVENTOR.
JOHN D.M. VELTE
BY
ATTORNEYS

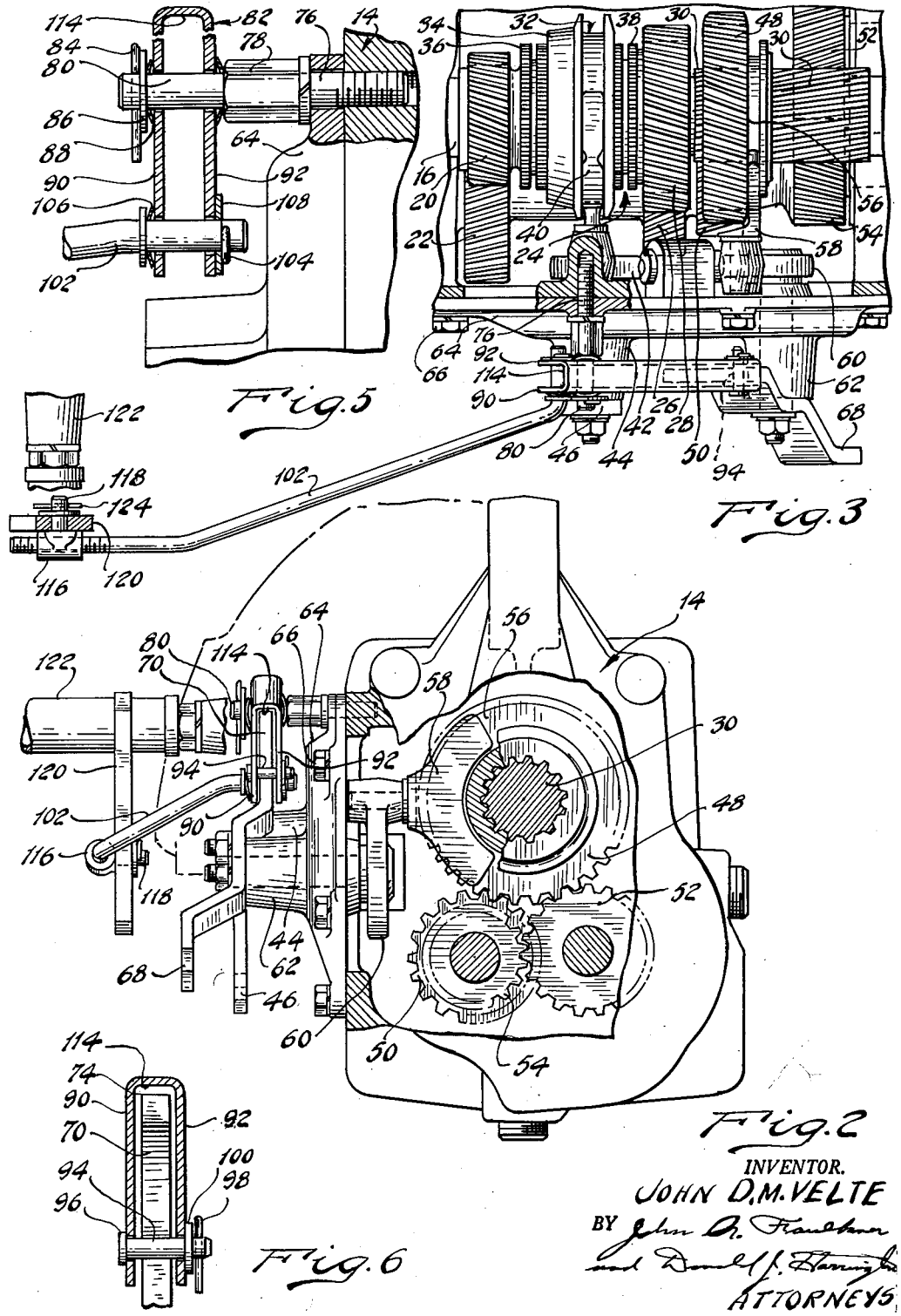

United States Patent Office 3,084,773
Patented Apr. 9, 1963

3,084,773
TRANSMISSION SHIFT CONTROLLING
MECHANISM
John D. M. Velte, Trenton, Mich., assignor to Ford
Motor Company, Dearborn, Mich., a corporation of
Delaware
Filed Jan. 17, 1961, Ser. No. 83,277
10 Claims. (Cl. 192—3.5)

My invention relates generally to power transmission mechanisms, and more particularly to a new and improved mechanical linkage by means of which the relative motion of the torque transmitting gear elements of the mechanism can be controlled.

The principles of my invention can be applied readily to a manually controlled multiple speed power transmission mechanism for automotive vehicles. For the purpose of particularly describing my instant invention, reference will be made to the accompanying drawings, wherein:

FIGURE 1 is a side elevation view of a manually shiftable power transmission mechanism. This view illustrates the linkage employed for actuating the power transmitting gear elements;

FIGURE 2 is a front elevation view of the mechanism of FIGURE 1;

FIGURE 3 is a partial assembly view showing the gear elements for the mechanism of FIGURES 1 and 2;

FIGURE 4 is a subassembly view showing a portion of the linkage for actuating the gear elements;

FIGURE 5 is a partial cross-sectional view of the gear shifting linkage and is taken along section line 5—5 of FIGURE 1; and FIGURE 6 is a partial cross-sectional view of a portion of the linkage mechanism of FIGURE 1 and is taken along section line 6—6 of FIGURE 1.

Referring first to FIGURE 1, numeral 10 generally designates a transmission clutch housing that may be bolted to the rear face of a vehicle engine cylinder block, shown in part at 12. Numeral 14 generally designates a transmission housing of cast construction that may be bolted to the clutch housing 10. Housing 14 encloses the torque transmitting gear elements of the mechanism.

A power input shaft for the gear mechanism is shown at 16. Shaft 16 can be connected to the engine crankshaft through a suitable clutch mechanism shown in part at 17. Shaft 16 is journaled by a suitable bearing 18 that is positioned within a cooperating bearing opening formed in the housing 14.

Referring next to FIGURE 3, the shaft 16 is connected to a power input gear 20 that continuously meshes with a gear 22. This gear 22 forms a part of a cluster gear assembly 24.

Shaft 16 can be clutched selectively to an engine driven flywheel 21 by means of a clutch friction disc shown at 17. This disc is connected to clutch hub member 23 that is splined internally to shaft 16. Pressure is applied to the disc 17 by means of a clutch pressure plate 13 that in turn is rotatable with the clutch housing. The pressure plate 13 can be spring urged into engagement with the disc 17 and released by driver operated clutch release levers 15. These in turn can be actuated by a conventional driver operated clutch throw-out bearing.

The assembly 24 further includes a gear 26 that continuously meshes with an intermediate speed gear 28. This is journaled in turn for rotation about an intermediate shaft 30.

A synchronizer clutch mechanism generally designated by reference character 32 is employed for the purpose of selectively connecting the intermediate shaft 30 to the gear 28 or to the shaft 16. The synchronizer clutch mechanism 32 is adapted to synchronize the speeds of rotation of gear 20 and the shaft 30 before clutching action is established therebetween. In a similar fashion clutch mechanism 32 synchronizes the motion of gear 28 with respect to shaft 30 prior to locking the gear 28 to the shaft 30.

Synchronizer clutch mechanism 32 includes an internally splined sleeve 34 that is connected slidably to a synchronizer hub that is fixed in turn to shaft 30. When the sleeve 34 is moved in a left-hand direction, as viewed in FIGURE 3, it becomes locked to clutch teeth 36 formed on gear 20, thereby establishing a driving connection between gear 20 and shaft 30.

When sleeve 34 is moved in a right-hand direction, as viewed in FIGURE 3, the internal teeth thereon engage external clutch teeth 38 formed on gear 28.

Sleeve 34 can be shifted in either axial direction by means of a shifter fork 40. Shifter fork 40 in turn is connected to an arm 42 that is carried by a shaft journaled within a boss 44. This shaft is connected positively to a lever 46 mounted externally of the transmission housing 14.

A low and reverse gear is identified by reference character 48. This gear is splined to shaft 30 although it is capable of moving axially thereon.

When the gear 48 assumes the position shown in FIGURES 1 and 3, it drivably engages a gear 50 that forms a portion of the cluster gear assembly 24. When the gear 48 is positioned in this fashion, the transmission mechanism is conditioned for its maximum torque multiplication ratio.

When the gear 48 is shifted in a right-hand direction, engagement with gear 50 is interrupted and it then engages a reverse idler gear identified in FIGURE 1 by reference numeral 52. This reverse idler is in engagement with reverse gear 54 on the cluster gear assembly 24.

The gear teeth for the gear 48 are helical in form. During operation in the low speed ratio the torque reaction on the gear 48 is such that an axial thrust is established in a left-hand direction as viewed in FIGURE 3. This tends to maintain the gear 48 in continuous engagement.

The gear 48 is formed with an annular groove 56 within which a shifter fork 58 is situated. The fork 58 is carried by an arm 60 that is journaled on a boss 62 situated externally of the housing 14. The boss 62 and the aforementioned boss 44 are formed on a cover plate 64. Cover plate 64 is bolted in turn to the side of the housing 14 by suitable bolts 66.

The shaft to which arm 60 is connected extends through the boss 62 and is connected to a lever 68 located externally on the housing portion 14. Lever 68 includes a lower portion that may be connected to a suitable manually operated shift linkage in a known fashion. The upper portion of the lever 68 as viewed in FIGURE 1 is formed with a cam surface 70 at the terminal portion thereof. A second cam surface 72 is formed on the opposite side of this terminal lever portion and the two surfaces 70 and 72 meet at the juncture 74.

Referring next to FIGURE 5, a bolt 76 is received threadably within the housing portion 14. A suitable hexagonal portion 78 is provided for accommodating a hand tool, such as a wrench.

The bolt 76 includes an extension 80 on which is received an interlock member 82. The member 82 is adapted to oscillate about the axis of extension 80 and it is held in place by means of a cotter key 84. A flat washer 86 and a spring washer 88 are situated between the key 84 and the member 82.

The interlock member and the means for pivotally mounting it on shaft extension 80 are viewed from the side in FIGURE 4.

When viewed in cross section, member 82 is of U- shaped construction and it comprises two parallel walls 90 and 92. As best seen in FIGURE 6, a cam follower 94 extends between the walls 90 and 92. The follower 94 is formed with a head 96 and it is secured in place by means of a cotter key 98. A flat washer is indicated at 100.

The terminal portion of the upward end of the lever 68 extends within the walls 90 and 92 of the member 82 and the cam surface 70 is adapted to engage the cam follower 94 as indicated in FIGURE 1.

Referring next to FIGURES 4 and 5, the terminal portion of an actuator rod 102 extends through the walls 90 and 92 and is held in place by a cotter key 104. A spring washer 106 can be situated against a cooperating shoulder on the rod 102 and a flat washer 108 can be situated on the opposite side of the member 82.

The member 82 is slotted as shown in FIGURE 1 at 110 so that the rod 102 can reciprocate relative to the member 82 with a lost motion characteristic. A spring 112 encircles the extension 80 for the bolt 76 and one end thereof engages one wall 114 of the member 82. The other end of the spring 112 engages the terminal portion for the rod 102. The spring 112 is pre-tensioned so that the rod 102 is biased normally in a left-hand direction as viewed in FIGURE 1 against the end of the slot 110.

The other end of the rod 102 is threaded and is connected to an adaptor 116 having an extension 118. A clutch equalizer lever 120 is pivoted for oscillation about the axis of a clutch shaft 122. The extension 118 is received through the lever 120 as indicated. A suitable cotter key 124 can be provided for retaining the adaptor 116 in place.

When the vehicle neutral clutch is in the engaged position, the lever elements assume the positions shown in FIGURE 1. When the clutch is disengaged by the vehicle operator, the rod 102 is shifted in a right-hand direction thereby causing the member 82 to revolve about the axis of bolt 76. Cam follower 94 then moves in an upward direction away from the cam surface 70. The shifting lever 68 can then be actuated by the vehicle operator in the normal fashion to release the gear 48 from its intermediate speed position. A clockwise movement of the lever 68 as viewed in FIGURE 1 will correspond to a shifting movement of the gear 48 in a right-hand direction as viewed in FIGURE 3.

The helical gear teeth on the gear element 48 will tend to create a thrust in the right-hand direction when the vehicle is braking while it is conditioned for operation in the low speed range. This is due to the fact that a torque reversal is experienced under engine braking conditions. This torque reversal may be sufficient to urge the gear element 48 out of engagement with the gear 50. The member 82 and the cooperating cam surface 70 will prevent this from happening, however, since the lever 68 cannot be moved in a clockwise direction while the member 82 is in place.

Under certain extreme conditions, the clockwise moment applied to lever 68 may inhibit the movement of the member 82. This would interfere with disengagement of the neutral clutch were it not for the fact that a lost motion connection between the rod 102 and the member 82 is provided. This lost motion connection makes it possible for the equalizer lever 120 to be moved in a counterclockwise direction as viewed in FIGURE 1 to release the neutral clutch. This, of course, relieves the torque and when the torque is relieved in this fashion, the axial thrust on the gear 48 is relieved correspondingly. This reduces the turning moment of the lever 68 and the member 82 will then be able to revolve in a counterclockwise direction as viewed in FIGURE 1 to permit the vehicle operator to shift the transmission normally from the low speed range if this is desired.

Having thus described the principal features of a preferred embodiment of my invention, what I claim and desire to secure by United States Letters Patent is:

1. In a power transmission mechanism comprising a power input shaft, a power output shaft, releasable clutch structure connected to said power input shaft, said clutch structure being adapted to transfer driving torque from a power source to said power input shaft, gears drivably connecting said shafts and forming therebetween a torque delivery path, linkage means for shifting one of said gears into and out of meshing engagement with another gear, and a locking element movable into and out of engagement with an element of said linkage means whereby said gears are maintained in driving engagement, said locking element being mechanically connected to said clutch structure whereby the former is moved out of locking engagement with respect to said linkage means when the latter assumes a released condition, one of said elements including a cam surface, a cam follower defined by the other of said elements, said follower being engageable with said cam surface when said linkage means element is moved to a position intermediate the positions corresponding respectively to the engaged and disengaged condition of said gears whereby said linkage means element is urged to one of said positions when said clutch structure is engaged.

2. In a power transmission mechanism comprising a power input shaft and a power output shaft, releasable clutch structure connected to said power input shaft, said clutch structure being adapted to transfer driving torque from a power source to said power input shaft, helical gears drivably connecting said shafts and forming therebetween a torque delivery path, linkage means for shifting one of said gears into and out of meshing engagement with another gear, the axial component of the tangential gear tooth load on said gears normally tending to urge said gears out of meshing engagement with respect to each other, and a locking element movable into and out of engagement with an element of said linkage means whereby said gears are maintained in driving engagement, said locking element being mechanically connected to said clutch structure whereby the former is moved out of locking engagement with respect to said linkage means element when the latter assumes a released condition, one of said elements including a cam surface, a cam follower defined by the other of said elements, said follower being engageable with said cam surface when said linkage means element is moved to a position intermediate the positions corresponding respectively to the engaged and disengaged condition of said gears whereby said linkage means element is urged to one of said positions when said clutch structure is engaged.

3. In a power transmission mechanism comprising a power input shaft and a power output shaft, releasable clutch structure connected to said power input shaft, said clutch structure being adapted to transfer driving torque from a power source to said power input shaft, helical gear elements drivably connecting said shafts and forming therebetween a torque delivery path, the axial component of the gear tooth load on said helical gear elements normally biasing said gear elements out of meshing engagement with respect to each other, linkage means for shifting one of said gear elements into and out of engagement with the other gear element, and a locking element movable into and out of engagement with an element of said linkage means whereby said gear elements are maintained in driving engagement, a yieldable connection between said locking element and said clutch structure whereby the former is moved out of locking engagement with respect to said linkage means when the latter assumes a released condition, said yieldable connection accommodating adjustment of said clutch structure to a released condition when the torque reaction on said gear elements is extreme.

4. A power transmission mechanism comprising a power input shaft, a power output shaft, releasable clutch structure connected to said power input shaft, said clutch structure being adaptable to transfer driving torque from a power source to said power input shaft, gear elements drivably connecting said shafts and forming therebetween a torque delivery path, linkage means for shifting one of said gear elements into and out of meshing engagement with the other gear element, and a locking element movable into and out of engagement with one element of said linkage means whereby said gear elements are maintained in driving engagement, a yieldable lost motion connection between said locking element and said clutch structure whereby the former is moved out of locking engagement with respect to said linkage means when the latter assumes a released condition, said yieldable connection permitting disengagement of said clutch structure independently of said locking element when the torque reaction acting on the latter is extreme.

5. The combination as set forth in claim 3 wherein said yieldable connection comprises a motion transmitting rod interconnecting said clutch structure and said locking element, said locking element being formed with an elongated slot within which said motion transmitting rod is received, and a spring normally acting between said locking element and said rod whereby the latter is maintained in engagement with one end of said slot, said spring being yieldable to permit relative motion between said rod and said locking element when the torque reaction on said locking element is extreme.

6. The combination as set forth in claim 4 wherein said yieldable connection comprises a motion transmitting rod interconnecting said clutch structure and said locking element, said locking element being formed with an elongated slot within which said motion transmitting rod is received, and a spring normally acting between said locking element and said rod whereby the latter is maintained in engagement with one end of said slot, said spring being yieldable to permit relative motion between said rod and said locking element when the torque reaction on said locking element is extreme.

7. A power transmission mechanism comprising a power input shaft, a power output shaft, releasable clutch structure connected to said power input shaft, said clutch structure being adapted to transfer driving torque from a power source to said power input shaft, gear elements drivably connecting said shafts and forming therebetween a torque delivery path, linkage means for shifting one of said gear elements into and out of meshing engagement with the other gear element, a portion of said linkage means defining a cam surface, a locking element movable into and out of engagement with said portion of said linkage means, said locking element including a cam follower engageable with said cam surface whereby said linkage means is maintained in an operative position when said locking element assumes one extreme position, said locking element being mechanically connected to said clutch structure whereby the former is moved out of locking engagement with respect to said linkage means when the latter is in a released position.

8. A power transmission mechanism comprising a power input shaft, a power output shaft, releasable clutch structure connected to said power input shaft, said clutch structure being adapted to transfer driving torque from a power source to said power input shaft, gear elements drivably connecting said shafts and forming therebetween a torque delivery path, linkage means for shifting one of said gear elements into and out of meshing engagement with the other gear element, said linkage means including a portion having a pair of cam surfaces formed on either side thereof and movable about the central axis from one extreme position to another, said gear elements assuming a fully engaged condition when said portion of said linkage means assumes one of said positions and assuming a neutral released condition when said portion of said linkage means assumes the other extreme position, a locking element movable into and out of engagement with said portion of said linkage means, said locking element including a cam follower engageable with either one or the other of said cam surfaces, said locking element urging said portion of said linkage means toward a fully engaged position when said cam follower engages one cam surface and being moved to a neutral position when said cam follower engages said other cam surface.

9. In a power transmission mechanism comprising a power input shaft, a power output shaft, releasable clutch structure connected to said power input shaft, said clutch structure being adapted to transfer driving torque from a power source to said power input shaft, a power transmission casing, gears drivably connecting said shafts and forming therebetween a torque delivery path, said gears being mounted within said casing, linkage means for shifting one of said gears into and out of meshing engagement with another of said gears, said linkage means including an arm engageable with a portion of said one gear and located within said casing and another arm journaled for oscillation on the exterior of said casing, each of said arms being connected to a common shaft rotatably supported by said casing, and an interlock element pivotally mounted on the exterior of said casing and including an arm mechanically connected to said clutch structure, said interlock element and the said other arm for actuating said one gear comprising interengageable parts, said parts being movable to an interlocked condition to prevent shifting movement of said one gear when said clutch structure assumes an applied condition.

10. In a power transmission mechanism comprising a power input shaft, a power output shaft, releasable clutch structure connected to said power input shaft, said clutch structure being adapted to transfer driving torque from a power source to said power input shaft, helical gears forming a torque delivery path between said shafts, a power transmission casing, said helical gears being mounted rotatably within said casing, linkage means for shifting one of said gears into and out of meshing engagement with another of said gears, said linkage means including a first arm engageable with said one gear within said casing and a second arm rotatably mounted on the exterior of said casing, said first and second arms being connected to a common shaft that is rotatably supported by said casing, the axial component of the tangential gear tooth load on said gears normally tending to urge said gears out of meshing engagement with respect to each other during torque delivery through said path in one direction, and an interlock member journaled rotatably upon the exterior of said housing, said interlock member being mechanically connected to said clutch structure, said second arm and said interlock member including interengageable parts that assume an interlocking condition when said clutch structure is caused to assume an applied condition whereby said one gear is inhibited from shifting from its torque delivery condition when said clutch structure is applied.

References Cited in the file of this patent
UNITED STATES PATENTS

| | | |
|---|---|---|
| 2,121,157 | Lempereur et al. | June 21, 1938 |
| 2,163,741 | Weaver | June 27, 1939 |
| 2,226,205 | Linsley | Dec. 24, 1940 |
| 2,233,790 | Linsley | Mar. 4, 1941 |
| 2,293,573 | Szepe | Aug. 18, 1942 |